United States Patent [19]

Rossmaier, deceased

[11] 4,048,286

[45] Sept. 13, 1977

[54] PROCESS FOR THE DECONTAMINATION OF WASTE MATERIALS

[75] Inventor: Viktor Rossmaier, deceased, late of Oberaudorf, Germany, by Emmy Rossmaier, heiress

[73] Assignee: Linde Aktiengesellschaft, Wiesbaden, Germany

[21] Appl. No.: 670,541

[22] Filed: Mar. 25, 1976

[30] Foreign Application Priority Data

Apr. 1, 1975 Germany .............................. 2514198

[51] Int. Cl.$^2$ .......................................... C01B 17/60
[52] U.S. Cl. ...................................... 423/242; 55/73; 162/30 R; 423/539; 423/DIG. 3
[58] Field of Search ................. 210/71; 162/36, 30 K, 162/30 R; 423/525, 531, 539–542, 242, DIG. 3; 208/13; 55/68, 73

[56] References Cited

U.S. PATENT DOCUMENTS

| 2,351,780 | 6/1944 | Palmrose | 162/36 X |
|---|---|---|---|
| 3,359,069 | 12/1967 | Furkert | 423/540 |
| 3,578,396 | 5/1971 | Priestly | 162/30 R |
| 3,647,363 | 3/1972 | Chari et al. | 162/36 X |
| 3,654,070 | 4/1972 | Pradt et al. | 162/30 R |
| 3,849,536 | 10/1974 | Morgan | 162/30 R |
| 3,870,631 | 3/1975 | Fassell et al. | 210/71 X |
| 3,920,548 | 11/1975 | Fassell et al. | 210/71 X |

FOREIGN PATENT DOCUMENTS

| 474,142 | 6/1951 | Canada | 162/36 |
|---|---|---|---|
| 1,517,203 | 12/1965 | Germany | 162/30 R |

*Primary Examiner*—Frank W. Lutter
*Assistant Examiner*—N. Greenblum
*Attorney, Agent, or Firm*—Karl F. Ross

[57] ABSTRACT

Combustible carbonaceous and sulfur-containing wastes, especially waste liquors of cellulose plants, are burnt with a combustion-sustaining gas having a greater oxygen concentration than atmospheric oxygen (e.g. pure oxygen) and the gaseous products of the combustion are subjected to scrubbing to remove carbon oxides. The process is carried out under pressure and preferably with two-stage combustion so that carbon monoxide produced in an initial stage can be burnt further in the combustion chamber of a gas turbine to drive the latter and generate at least part of the power necessary to operate the compressor for the oxygen-rich gas.

10 Claims, 1 Drawing Figure

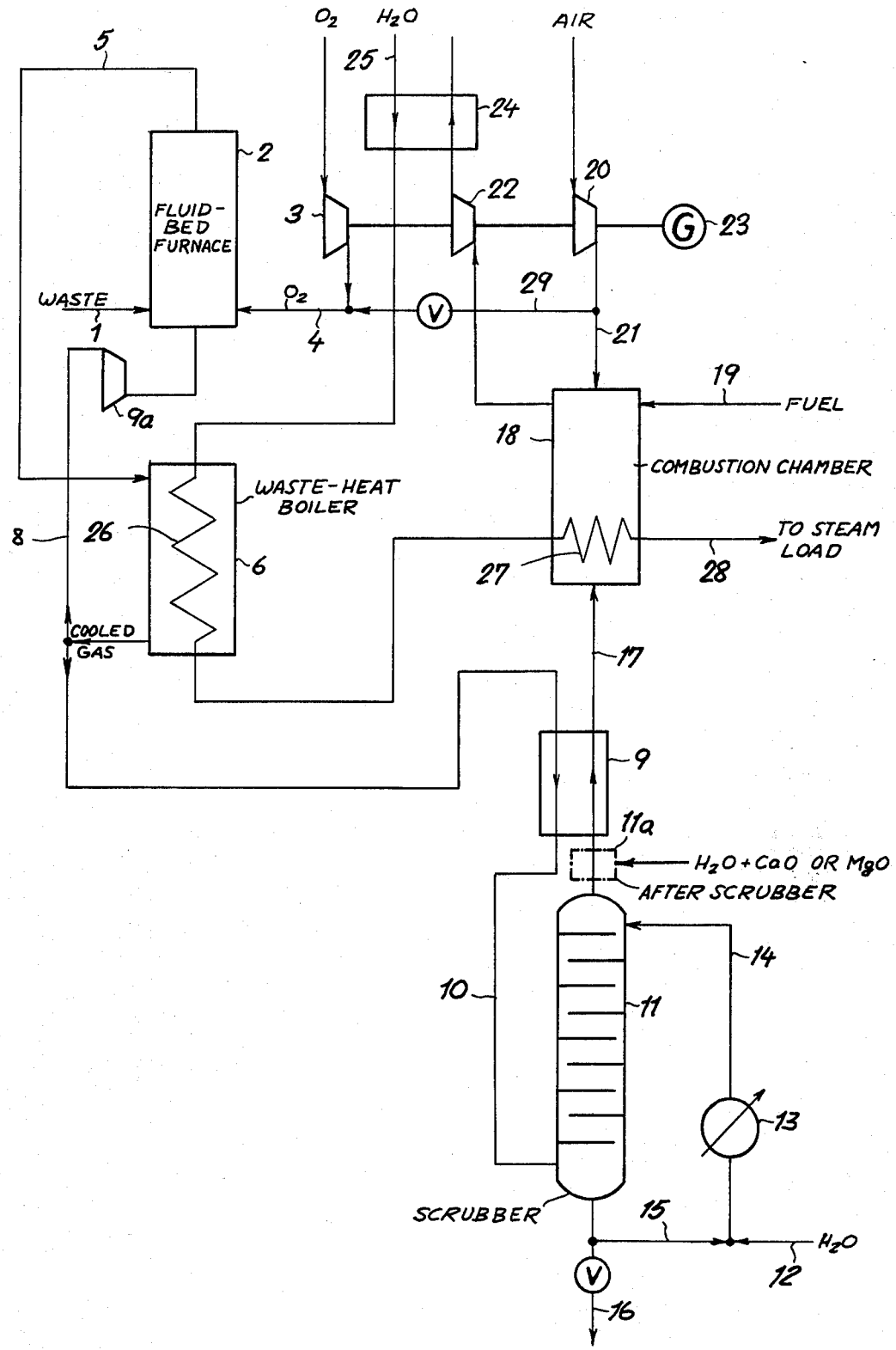

PROCESS FOR THE DECONTAMINATION OF WASTE MATERIALS

FIELD OF THE INVENTION

The present invention relates to a process for the treatment of wastes containing carbonaceous materials and environmental contaminants, such as sulfur compounds, by combustion and, more particularly, to a process for the elimination of contaminants from wastes which are to be discharged into the environment.

BACKGROUND OF THE INVENTION

The treatment of waste fluids, e.g. processing plant liquors, containing both sulfur compounds and organic (carbon) compounds by combustion so as to eliminate these environmental pollutants, is known.

In such processes, the waste, e.g. a solution, suspension slurry or even flowable solid, is burnt to produce an exhaust gas which is subjected to physical or chemical scrubbing to eliminate contaminants or pollutants present in the exhaust gas, e.g. sulfur dioxide.

In such processes the combustion products of the exhaust gas include carbon dioxide and sulfur dioxide, as noted, and it is essential to remove practically all of the sulfur dioxide. The processes have been employed to increasing extents in the cellulose industry for the processing of cellulose digestion liquors (see WO-CHENBLATT FOR PAPIERFABRIKATION, 23/24, 1972, pages 910 ff.).

The combustion-sustaining gas required for these processes is atmospheric oxygen. Since the concentration of the contaminants in the exhaust gas and therefore their partial pressure is generally low, the requirements for effective removal of these contaminants (e.g. $SO_2$) are considerable. In other words, in order to reduce the concentration of the toxic contaminants of the exhaust gas stream to an environmentally acceptable level when the latter stream is discharged into the atmosphere, the scrubbing must be rigorous, the cooling to separate liquid from the gas phase during the washing must be considerable or washing and scrubbing agents must be used with high tendencies to pick up the traces of the toxic components.

These requirements indicate expensive scrubbing apparatus, high energy losses because of the degree of cooling required, and large expenses connected with the use of high-quality scrubbing agents.

OBJECTS OF THE INVENTION

It is the principal object of the present invention to provide an economical process for the elimination or treatment of organically contaminated wastes.

It is another object of the present invention to provide an improved method of burning organically and sulfur-contaminated wastes whereby the level of toxic components introduced into the environment is reduced without high capital expenditure, high energy cost or high operating expenses.

Still another object of the invention is to provide a process for the destruction of cellulose digestion liquors whereby the aforementioned disadvantages are avoided.

SUMMARY OF THE INVENTION

These objects and others which will become apparent hereinafter are attained, in accordance with the present invention, in a process for the combustion of wastes, especially organically contaminated sulfur-containing wastes capable of producing gaseous contaminants in the exhaust gas, in which the combustion-sustaining gas has an elevated oxygen content over that of atmospheric oxygen. More specifically, the combustion-sustaining gas can be air strongly enriched with oxygen, technical-grade oxygen containing traces of nitrogen, or pure oxygen. In any event the preferred oxygen content of the combustion-sustaining gas is 50 to 100% by volume; most desirably 90 to 100%.

By the use of a combustion-sustaining gas having an oxygen concentration which is substantially greater than that of air for the combustion of wastes, the concentration and therefore the partial pressure of the gaseous contaminant in the exhaust gas, e.g. $SO_2$, is sharply increased and thus the degree of removal of this contaminant in the subsequent scrubbing step is improved markedly.

Furthermore, the combustion process is not unnecessarily diluted by the presence of large quantities of inert nitrogen from the air so that the concentration of the exhaust gas is further increased. It should be noted that the nitrogen carried by atmospheric air into conventional systems dilutes the exhaust gas and reduces the partial pressure of the contaminants therein.

It has been found that, with the use of pure oxygen, for example, the relative concentration of toxic components such as $SO_2$ in the exhaust gas and the partial pressure thereof, to a first approximation, can be increased about fivefold with corresponding increase in the scrubbing effectiveness.

I have found further that it is possible to increase the partial pressure of contaminants such as $SO_2$ in the exhaust gas when the combustion is carried out under superatmospheric pressure (as contrasted with atmospheric pressure). The preferred pressures for operating the combustion step of the present invention are 5 atmospheres absolute to 25 atmospheres absolute with most effective results at about 10 atmospheres absolute. At a pressure of about 10 atmospheres absolute the partial pressure of the contaminant in the exhaust gas can be increased by about ten times over the corresponding value when combustion is effected at atmospheric pressure.

With the system of the present invention, in which combustion is carried out at superatmospheric pressure and with elevated oxygen content of the combustion-sustaining gas, the washing or scrubbing liquid can be water since a high degree of removal of the $SO_2$ is obtained. In fact, the $SO_2$ is almost completely absorbed. However, it may be desirable in some circumstances, to utilize an absorption and scrubbing agent with a greater ability to remove $SO_2$ from the gas stream. In this case magnesium oxide or calcium oxide can be introduced into the scrubbing liquid. In an after-scrubbing is found to be desirable, it preferably is carried out with water containing one of these scrubbing agents.

A further advantage of the present invention resides in that the waste heat boiler which cools the combustion gases, at least in part, can be made substantially smaller because of the increased pressure at which the combustion stage is operated. In the waste heat boiler a part of the combustion heat is transferred, by indirect heat exchange, to a heat-carrying fluid such as steam. The heat transfer surface area of the waste heat boiler is proportional to the empirical factor $$(p.v)^{-0.78}$$

where $p$ is the pressure of the exhaust gas and $v$ is the velocity thereof, the heat exchange area can be decreased as the pressure is increased.

To compensate at least in part for the energy consumed in compressing the combustion-sustaining oxygen, I provide for the recovery of work by the expansion of the exhaust gas in a turbine driving the compressor or an electrical generator whose output contributes to the compressor drive. To this end, a portion of the purified exhaust gas, following the scrubbing, is expanded in a work-producing step:

the gas turbine is provided with a combustion chamber which is supplied with the gas to be expanded, the latter being heated by the hot combustion gases and permitted to expand together with the combustion gases in the turbine. Because of the additional expansion of the purified gases of the scrubbing stage (residual gas) which have a high carbon dioxide content, the turbine efficiency is correspondingly increased.

According to an important feature of the invention, the initial stage of combustion with the oxygen-rich gases is controlled to be incomplete in the sense that the combustion does not proceed to complete oxidation of the carbonaceous substances to $CO_2$ but terminates at a stage at which a large proportion of the carbon oxides is constituted by carbon monoxide (CO). The further combustion of the CO to $CO_2$ is carried out with the supply of air in the combustion chamber of the gas turbine.

This has been found to reduce the oxygen requirements for the direct combustion of the wastes to about half. Furthermore, the solubility of carbon monoxide in the scrubbing solution is substantially less than that of carbon dioxide so that the scrubbing solution is not unduly saturated with carbon oxides and can fulfill its primary function of removing the sulfur oxides. Finally, the carbon monoxide is used as a fuel for the gas turbine and hence there is a saving in cost with respect to other fuels which would be required (e.g. natural gas or light fuel oil) to drive the turbine.

BRIEF DESCRIPTION AND EXAMPLE

The above and other objects, features and advantages of the present invention will become more readily apparent from the following description, reference being made to the accompanying drawing, the sole FIGURE of which is a flow diagram of a plant for carrying out the process of the present invention.

SPECIFIC DESCRIPTION

The plant shown in the drawing is generally applicable to any process for the thermal elimination of wastes containing cellulosic materials or other carbonaceous or organic substances and sulfur compounds, in spite of the fact that it is here described, for the sake of specific example, for the elimination of waste liquors from a cellulosic plant. The cellulosic waste liquors are delivered by line 1 to a fluidized bed furnace 2 in which it is burnt in the process of pure oxygen or oxygen-enriched air containing, say, 90% by volume oxygen. The oxygen is supplied by a compressor 3 at the operating pressure of the furnace 2 (10 atmospheres absolute) via a line 4.

The furnace temperature is about 1000° C.

The exhaust gases, consisting predominantly of carbon dioxide, carbon monoxide, water vapor, sulfur dioxide and nitrogen, are led via line 5 to a waste heat boiler 6 and passed in indirect heat exchange with water of a further circulation system to be described in greater detail below. The gas is thereby cooled to a temperature of about 250° C.

To prevent the exhaust gas temperature from rising above the desired volume, a portion of the exhaust gas, still containing $SO_2$ or possibly even $SO_3$, is returned via line 8 and a blower 9a to the fluidized bed furnace as a direct heat-exchange cooling agent.

The balance of the exhaust gases are passed through a heat exchanger 9 and cooled to a temperature of 4° to 25° C therein.

The cooled exhaust gases are admitted by a line 10 to a scrubbing column 11 and rise through the multiplicity of stages in this column against wash water which is supplied via line 12. The column 11 is operated at pressure of about 10 atmospheres absolute and scrubs the $SO_2$ from the exhaust gas.

The wash water is cooled at 13 to a temperature of 0° to 10° C and is sprayed via line 14 into the head of the column.

The sump product of column 11, containing most of the $SO_2$ of the exhaust gas, is recirculated partly at 15 to be mixed with the fresh water and is partly withdrawn at 16. Line 16 can be connected to any conventional system for the further recovery of $SO_2$ from the wash water.

Since the combustion of the waste takes place, in this system, with pure or practically pure oxygen, the exhaust gas passed through the scrubber does not contain large quantities of inert nitrogen. Furthermore, the partial pressure of $SO_2$ in the exhaust gas is high, reaching a level which is further augmented by the elevated pressure which is used. The enrichment of the wash water in $SO_2$ is thus similarly high and it is not only possible to use water as the washing agent, as noted previously, but to recover so much sulfur dioxide in the wash liquid as to make removal of $SO_2$ from the wash liquid a commercially attractive operation.

The head product of the scrubber 11 consists of a gas having a high concentration of $CO_2$ and a pressure of about 10 atmospheres absolute, this gas being introduced through the heat exchanger 9 into indirect heat exchange with the warm gases from the waste heat boiler 6. The somewhat warmed carbon dioxide gases (residual gases) are fed via line 17 into the combustion chamber 18 of a gas turbine 22. Within this combustion chamber the gases contact heat exchanger coil 27 from the water cycle and are heated by direct heat exchange with combustion gases formed by burning a fuel introduced at 19 into the combustion chamber. The fuel can be natural gas or light heating oil and the air necessary for combustion of this fuel is supplied by a compressor 20 and line 21. The hot residual gas and the combustion gases mixed therewith are expanded in the turbine 22.

The turbine 22 is coupled to the compressor 20 to drive the latter with the energy supplied by expansion of the residual gas head product and the combustion gases from chamber 19. In addition, a generator 23 can be driven by this turbine 22 and the latter may also drive the compressor 3 mentioned previously.

Any residual sensible heat may be recovered from the turbine-driving gases via a heat exchanger 24 which heats the cooling water supplied at line 25 to the water cycle.

By the additional expansion of the clean exhaust gases in turbine 22 I am able to recover a large part of the energy used to compress the oxygen in compressor 3.

The system permits the energy balance to be maintained positive since the gas compressed in compressor 3 is oxygen which has a relatively low $C_p$ (specific heat at constant pressure) while the gas expanded has a high concentration in carbon dioxide and is thus a gas having a high $C_p$ value.

The water supplied at 25 in the feedwater cycle may be at a pressure of 130 atmospheres absolute and is preheated in the heat exchanger 24 by the remaining sensible heat of the expanded gases. The further heating of the feedwater takes place in the tube coils 26 of the waste heat boiler 6 whereby most of the combustion heat is absorbed by the water. The feedwater then traverses the radiator 27 and is further heated to a final temperature of about 530° C by the hot combustion gases of chamber 18. The feedwater is thus converted to superheated saturated steam which can be withdrawn from the system at line 28 for heating purposes within the plant or as a source of energy for driving a steam turbine or the like. The feedwater circulation system permits recovery of all waste heat generated at any point in the system and even permits recovery of the waste heat at the turbine 22 so that the economy of the system is considerable.

Should there be insufficient pure or substantially pure oxygen available for combustion in the fluidized bed furnace 2, the deficiency can be fulfilled by compressed air which is provided via line 29 from the outlet of the compressor 20 branches the additional compressed air into the oxygen line 4. An afterscrubber 11a can be used if desired, and is supplied with water containing CaO or regular MgO.

It has also been found to be advantageous to maintain the combustion conditions in the fluidized bed furnace 2 such that not all of the carbon is in the form of the dioxide or that a substantial proportion of the carbon of the exhaust gas from this furnace is in the form of its monoxide. This cuts the oxygen requirements at 4 to about half. The carbon monoxide has a substantially lower scrubability in water than carbon dioxide and thus remains after scrubbing to contribute to the combustion in chamber 18. The carbon monoxide is converted in this chamber to carbon dioxide and hence the efficiency of operation of the turbine is substantially unchanged from the embodiment previously described. In this manner I can eliminate the need for adding fuel at 19 since the combustion energy required at chamber 18 is supplied by the carbon monoxide carried via line 17 into the latter.

Since only about 30% of the fuel value of the carbon in the furnace 2 is utilized in producing the carbon monoxide, about 70% of the fuel value is carried via the exhaust gases from the furnace into the combustion chamber 18 at which it is converted to heat by combustion with air introduced at 21. The turbine is thus operated with about 20% of the fuel energy of a waste gas without any danger that a contaminant will be present therein.

It is claimed:

1. A process for the decomposition of a carbonaceous and sulfur-containing waste comprising the steps of burning said waste with a combustion-sustaining gas stream having an oxygen concentration of at least 50% by volume to produce an exhaust gas containing carbon oxides and sulfur dioxide; and scrubbing said sulfur dioxide from said exhaust gas to produce a scrubbed gas substantially free from sulfur oxides and a scrubbing liquid containing sulfur dioxide.

2. The process defined in claim 1 wherein the waste is burned with a gas consisting of substantially pure oxygen.

3. The process defined in claim 1 wherein said waste is burned with said combustion-sustaining gas at a superatmospheric pressure.

4. The process defined in claim 1 wherein said exhaust gas is scrubbed with water.

5. The process defined in claim 4 wherein the exhaust gas, after being scrubbed with water is scrubbed with water containing magnesium oxide or calcium oxide.

6. The process defined in claim 1, further comprising the step of removing from said exhaust gas a partial stream containing sulfur trioxide and returning same to the combustion of said waste with said combustion-sustaining gas.

7. The process defined in claim 1, further comprising the step of expanding the scrubbed exhaust gas in the combustion chamber of a turbine, and driving a load with said turbine.

8. The process defined in claim 7, further comprising the step of recovering from said turbine a gas containing waste heat and passing said gas containing waste heat in indirect heat exchange with a high pressure feedwater, thereby heating said feedwater.

9. The process defined in claim 8, further comprising the step of further heating said feedwater in a waste-heat boiler by indirect heat exchange of said exhaust gas therewith prior to the scrubbing of said exhaust gas.

10. The process defined in claim 8, further comprising the steps of controlling the combustion of said waste with said combustion-sustaining gas to form carbon monoxide from the carbonaceous substances of said waste and burning said carbon monoxide in said combustion chamber.

* * * * *